United States Patent
She et al.

(10) Patent No.: US 9,510,293 B2
(45) Date of Patent: Nov. 29, 2016

(54) ANTENNA SYSTEM AND METHOD FOR REPORTING RECEIVING POWER OF THE SAME

(71) Applicant: Alcatel Lucent, Boulogne Billancourt (FR)

(72) Inventors: Feng She, Shanghai (CN); Hongwei Yang, Shanghai (CN); Yun Deng, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 14 days.

(21) Appl. No.: 14/356,689

(22) PCT Filed: Nov. 6, 2012

(86) PCT No.: PCT/IB2012/002665
§ 371 (c)(1),
(2) Date: May 7, 2014

(87) PCT Pub. No.: WO2013/068838
PCT Pub. Date: May 16, 2013

(65) Prior Publication Data
US 2014/0301342 A1    Oct. 9, 2014

(30) Foreign Application Priority Data

Nov. 7, 2011    (CN) .......................... 2011 1 0379386

(51) Int. Cl.
*H04W 4/00* (2009.01)
*H04W 52/04* (2009.01)
(Continued)

(52) U.S. Cl.
CPC ........... *H04W 52/04* (2013.01); *H04B 17/318* (2015.01); *H04W 52/242* (2013.01); *H04W 52/245* (2013.01); *H04W 52/386* (2013.01); *H04W 52/40* (2013.01)

(58) Field of Classification Search
CPC ............. H04W 52/04; H04W 52/242; H04W 52/245; H04W 52/386; H04W 52/40
USPC .......................................................... 370/329
See application file for complete search history.

(56) References Cited

U.S. PATENT DOCUMENTS 7,085,559 B2    8/2006    Sato et al.
8,855,646 B2    10/2014   Ishii et al.
(Continued)

FOREIGN PATENT DOCUMENTS

CN    101155401        4/2008
EP    1 453 222 A2     9/2004
(Continued)

OTHER PUBLICATIONS

International Search Report for PCT/IB2012/002665 dated Apr. 2, 2013.
(Continued)

*Primary Examiner* — Sai-Ming Chan
(74) *Attorney, Agent, or Firm* — Fay Sharpe, LLP

(57) ABSTRACT

An antenna system and a method for reporting enhanced Reference Signal Receiving Power (eRSRP) of the same are provided. According to an embodiment of the present invention, the method for reporting eRSRP includes: transmitting, by an evolved Node Base (eNB), different reference signals to different transport points being distributed; measuring, by a user equipment (UE), eRSRP of the different transport points; and reporting, by the UE, the measured eRSRP of the different transport points to the eNB. Compared with the prior art, the eNB can obtain channel information of path loss of each transport point, to fundamentally solve the problem of unbalanced power, and can perform other optimization operations based on the information to improve the system throughput and other performance.

15 Claims, 5 Drawing Sheets

(51) Int. Cl.
*H04W 52/24* (2009.01)
*H04W 52/38* (2009.01)
*H04W 52/40* (2009.01)
*H04B 17/318* (2015.01)

(56) References Cited

U.S. PATENT DOCUMENTS

| | | |
|---|---|---|
| 2010/0069122 A1 | 3/2010 | Ito |
| 2011/0110251 A1* | 5/2011 | Krishnamurthy ... H04W 72/082 370/252 |
| 2011/0183672 A1* | 7/2011 | Jeong .................. H04B 17/318 455/436 |
| 2011/0244805 A1 | 10/2011 | Wu |
| 2013/0010744 A1 | 1/2013 | Kang et al. |
| 2013/0170362 A1* | 7/2013 | Futaki ................. H04W 24/02 370/241.1 |
| 2014/0233408 A1* | 8/2014 | Bontu ............... H04W 36/0094 370/252 |

FOREIGN PATENT DOCUMENTS

| | | |
|---|---|---|
| JP | 2010/068496 | 3/2010 |
| JP | 2011-217377 | 10/2011 |
| JP | 2012-514377 | 6/2012 |
| WO | WO 2009/116643 | 9/2009 |
| WO | WO 2010/077192 | 7/2010 |
| WO | WO 2011/118978 | 9/2011 |

OTHER PUBLICATIONS

Huawei, HiSilicon, "CSI-RS Port Selection for Distributed Antennas", 3GPP TSG RAN WG1#65, R1-112052, Aug. 22-26, 2011.
Taiwan Office Action dated Sep. 24, 2014 (translation only).
Huawei, "Further discussion on rank reporting issue", R1-113217, 3GPP TSG RAN WG1 Meeting #66bis, Zhuhai, China, Oct. 10-14, 2011.
Huawei, et al., "CSI-RS configuration and signalling", R1-112902, 3GPP TSG RAN WG1 Meeting #66bis, Zhuhai, China, Oct. 10-14, 2011.

* cited by examiner

ANTENNA SYSTEM AND METHOD FOR REPORTING RECEIVING POWER OF THE SAME

BACKGROUND OF THE INVENTION

1. Field of the Invention

The present invention relates to an antenna system and a method for reporting Reference Signal Receiving Power (RSRP) of the same, and more particularly to a distributed antenna system (DAS) and a method for reporting RSRP of the same.

2. Description of the Prior Art

In downlink Multiple Input Multiple Output (MIMO), a typical case of a DAS is deploying distributed antennas for indoor and outdoor use. The DAS is different from a conventional centralized wire system in that, path loss from distributed antenna ports at different geographical positions to a user equipment (UE) is different, thereby often causing the problem of unbalanced power. In order to solve the problem of unbalanced power, some technical solutions of adjustment and improvement may be performed at an evolved Node Base (eNB) side, in which the technical solutions include power compensation, transport point selection, and the like. These technical solutions require channel information of path loss of different transport points; however, in the current DAS, the eNB cannot obtain the information.

An application scenario of distributed antennas shown in FIG. 1 is taken as an example. In the scenario, an eNB 500 is disposed in a cell 50. In the figure, only a part of a macro base station (BS) node is shown. The eNB 500 allocates four distributed antennas 501, 502, 503, and 504 for serving a UE 505. The distributed antenna 501 is disposed on the macro BS node. Ports of the distributed antennas 501, 502, 503, and 504 are set to RRH0, RRH1, RRH2, and RRH3 respectively. Although reference signals, for example, channel state information-reference signals (CSI-RSs) CSI-RS0, CSI-RS1, CSI-RS2, and CSI-RS3, of the distributed antennas 501, 502, 503, and 504 are transparent to the UE 505, the UE 505 can report only one RSRP value to the eNB 500. Generally, the RSRP value is obtained by the UE 505 averaging measured RSRP0 and RSRP1 of the ports RRH0 and RRH1 of the distributed antennas. Due to lack of channel information of path loss of the distributed antennas 501, 502, 503, and 504, the eNB 500 cannot solve the problem of unbalanced power.

In fact, since the eNB cannot know the channel information of path loss of each distributed antenna, other problems, such as being inconvenient for transport point selection, being incapable of flexibly allocating resources, and reducing the system throughput, may be caused.

Therefore, the existing DAS and the method for reporting the RSRP need to be improved, to fundamentally solve the problem of unbalanced power.

SUMMARY OF THE INVENTION

An objective of the present invention is to provide an antenna system and a method for reporting receiving power of the same, to make the technical solution for solving the problem of unbalanced power feasible.

According to an embodiment of the present invention, a method for reporting receiving power includes: transmitting, by an eNB, different reference signals to different transport points being distributed; measuring, by a UE, eRSRP of the different transport points; and reporting, by the UE, the measured eRSRP of the different transport points to the eNB.

According to another embodiment of the present invention, the method for reporting receiving power further includes: notifying, by the eNB by means of signaling, the UE of reporting the eRSRP of the different transport points periodically or in an event triggering manner. An event for triggering the event triggered report includes: receiving, by the UE, an instruction of the eNB; or obtaining, through measurement by the UE, $|eRSRP_x - eRSRP_y| > T$, where $eRSRP_x$ is eRSRP of a transport point with a port number x among the different transport points, $eRSRP_y$ is eRSRP of a transport point with a port number y among the different transport points, and T is a preset receiving power difference threshold or a threshold configured by the eNB for the UE. The UE only reports the eRSRP of a part of the transport points according to an indication of the eNB, or the UE only reports the eRSRP of the transport points that satisfy an event triggering condition.

According to yet another embodiment of the present invention, the method for reporting receiving power further includes: receiving, by the eNB, the eRSRP of the different transport points from the UE, to determine a corresponding optimization scheme for solving a problem of unbalanced power at least. The problem of unbalanced power is solved by adjusting transmit power of the different transport points, a transport point selection operation, or a transport point grouping operation; and the adjustment includes increase, maintenance, or decrease. According to another embodiment of the present invention, the eRSRP is RSRP or a value of path loss, and the reference signal is a cell specific reference signal (CRS) or a CSI-RS. Moreover, in an embodiment of the present invention, when reporting the measured eRSRP of the different transport points to the eNB, the UE transmits port numbers of the corresponding different transport points. In another embodiment of the present invention, the UE reports the eRSRP of the different transport points sequentially in an order of ports allocated by the eNB to the reference signals of the different transport points. In an embodiment of the present invention, after measuring the eRSRP of the different transport points, the UE transmits the measured eRSRP to the eNB, or the UE transmits the measured eRSRP to the different transport points and then the different transport points transmit the eRSRP to the eNB.

An embodiment of the present invention further provides an antenna system, including: different transport points being distributed; an eNB, configured to transmit different reference signals to the different transport points; and a UE, configured to measure eRSRP of the different transport points, and reporting the measured eRSRP of the different transport points to the eNB.

Another embodiment of the present invention further provides an eNB located in a DAS and including: a reference signal transmitting component, configured to transmit different reference signals; and an eRSRP receiving component, configured to receive eRSRP of different transport points, to determine a corresponding optimization scheme for solving a problem of unbalanced power at least. In an embodiment of the present invention, the eNB further includes a signaling notification component, configured to notify, by means of signaling, the UE of reporting the eRSRP of the different transport points periodically or in an event triggering manner.

Another embodiment of the present invention further provides a UE, including: a measurement component, configured to measure eRSRP of different transport points in a distributed system; and a report component, configured to report the measured eRSRP of the different transport points to an eNB in the distributed system. In an embodiment of the present invention, the UE further includes a signaling receiving component, configured to receive a signaling sent by the eNB, whereby the report component reports the eRSRP of the different transport points periodically or in an event triggering manner in response to the received signaling.

Compared with the prior art, the antenna system and the method for reporting RSRP of the same provided by the present invention enable an eNB to obtain reference signal power of all transport points used for a UE, that is, know channel information of path loss of each distributed antenna, so that the problem of unbalance power can be solved by a corresponding means. Moreover, the eNB can further implement more flexible transport point selection and resource allocation, implement necessary power control, and improve the system throughput.

DETAILED DESCRIPTION

In order to better understand the spirit of the present invention, the present invention is further described below using a combination of selected preferred embodiments.

The Long Term Evolution (LTE) project is the largest new technology research and development project started by the 3rd Generation Partnership Project (3GPP) in recent years. This technology based on Orthogonal Frequency Division Multiplexing/Frequency Division Multiple Access (OFDM/FDMA) is regarded as a quasi-4G technology. The LTE will be the main wide area broadband mobile communication system worldwide, and in the future, all the 2G/3G/3.5G technologies will evolve to the LTE/LTE-Advanced (LTE-A) phase. At present, multiple LTE standard versions exist in the industry, but none of them solve the problem of unbalanced power in the DAS, thereby hindering further improvement and implementation of the technology.

It should be noted that, due to the development of the technology and the update of the standard, components having the same function usually have different names. For example, in the DAS, a transport point, a distributed antenna, and a remote radio head (RRH) are often alternately used by persons skilled in the art. Technical terms used in the patent application of the present invention are provided to explain and demonstrate the technical solution of the present invention. For example, generally, the transport point, the distributed antenna, and the RRH are generically called the transport point. When interpreting the terms, the functions commonly known in the art that associate with the terms prevail, and the terms cannot be interpreted arbitrarily in view of the differences in names.

Figure 1:
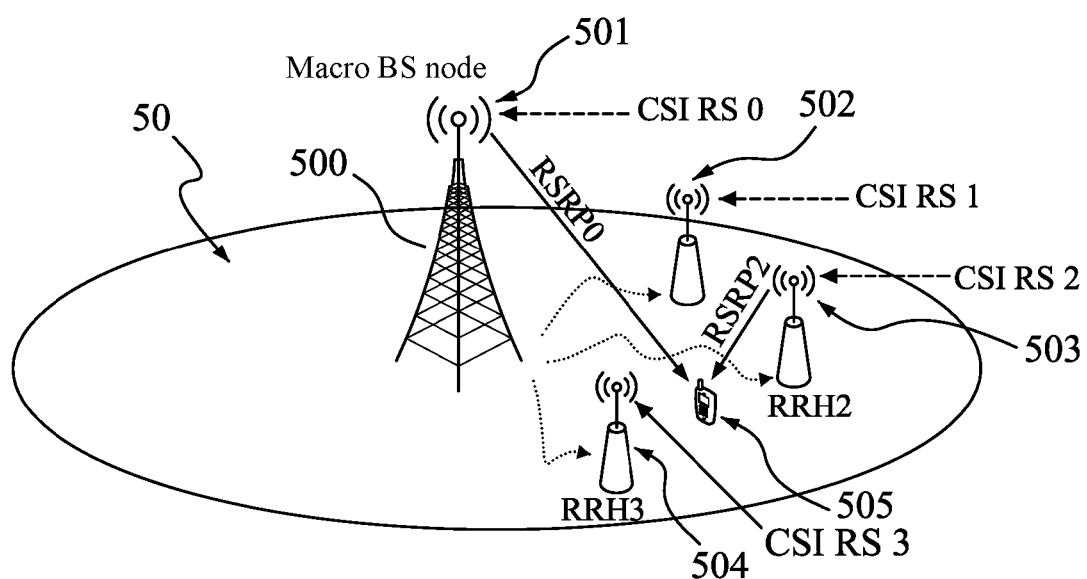
FIG. 1 is a schematic diagram of a scenario of an existing DAS.
Figure 2:
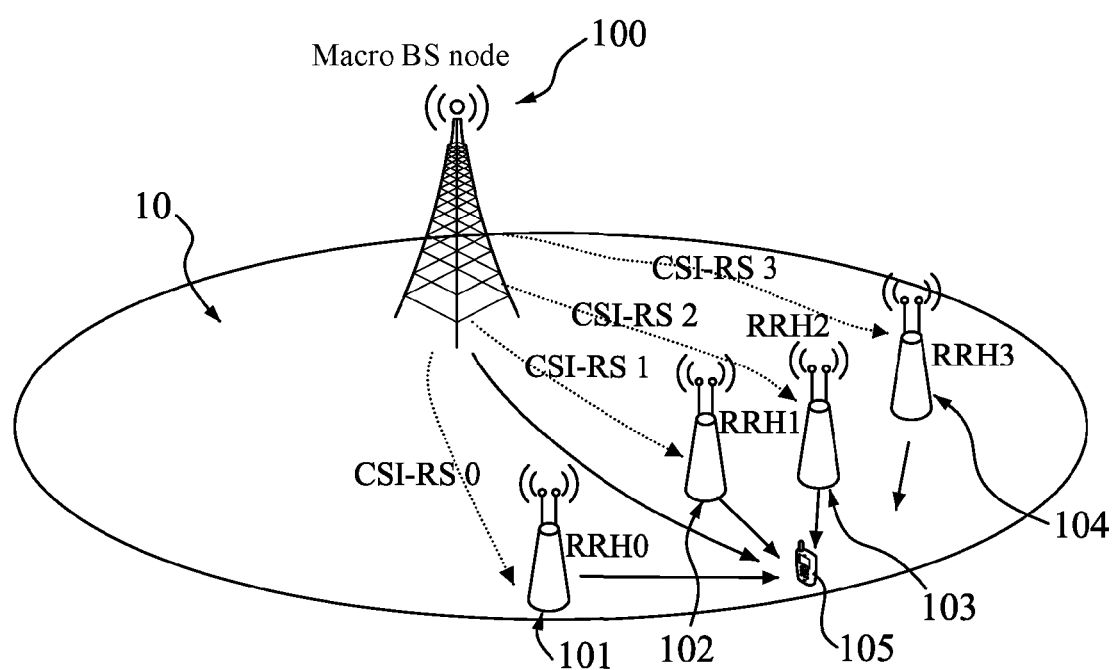
FIG. 2 is a schematic diagram of a scenario according to an embodiment of the present invention.

FIG. 2 is a schematic diagram of a scenario according to an embodiment of the present invention. In the scenario, provided are a cell 10, an eNB 100 located in the cell 10, four transport points 101, 102, 103, and 104 geographically separated, and a UE 105. In the LTE and LTE-A standards, an eNB represents a BS and corresponds to a UE. For the sake of convenience, FIG. 2 only shows a part of a macro BS node of the eNB 100. The four distributed transport points 101, 102, 103, and 104 all provide signal transmission services for the UE 105 and may be RRHs. Generally, the eNB 100 allocates corresponding port numbers. For example, the transport point 101 has a port number 0, the transport point 102 has a port number 1, the transport point 103 has a port number 2, and the transport point 104 has a port number 3, that is, RRH0, RRH1, RRH2, and RRH3 respectively.

Figure 3:
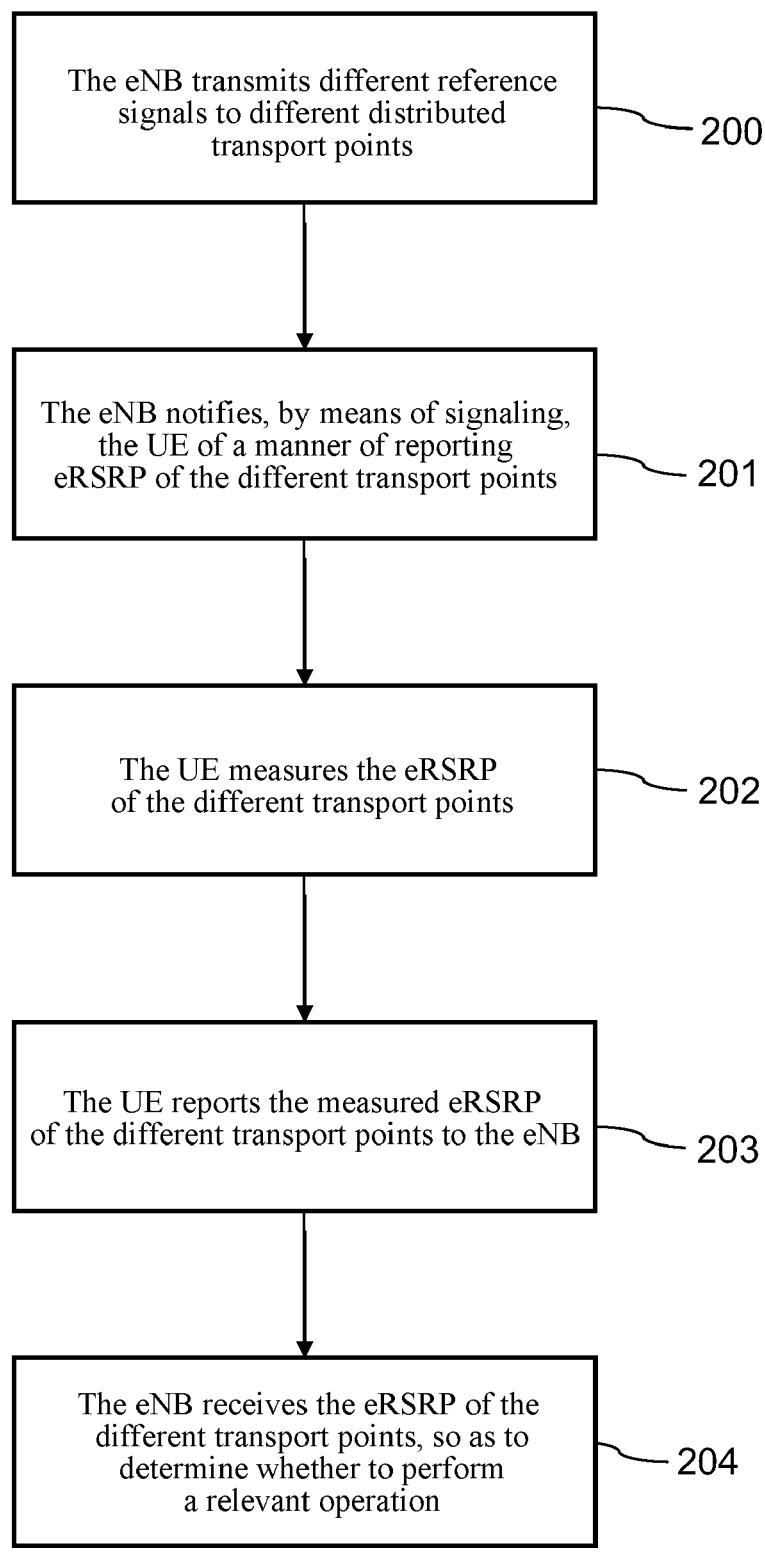
FIG. 3 is a flow chart of reporting eRSRP according to an embodiment of the present invention.

In FIG. 2, the UE 105 reports eRSRP of the transport points 101, 102, 103, and 104 to the eNB 100 through a process according to an embodiment of a report method of the present invention shown in FIG. 3. The eRSRP refers to receiving power of a reference signal transmitted by a certain transport point, in which the receiving power is measured by the UE. In the present invention, the eRSRP includes parameters capable of reflecting channel information of path loss, for example, RSRP and a value of path loss.

In Step 200, the eNB 100 transmits different reference signals to the different transport points 101, 102, 103, and 104 being distributed. The reference signal may be a CRS or a CSI-RS. In FIG. 2, the eNB 100 transmits different CSI-RSs to the transport points 101, 102, 103, and 104.

In Step 201, the eNB 100 notifies, by means of signaling, the UE 105 of reporting the eRSRP of the different transport points 101, 102, 103, and 104 periodically or in an event triggering manner. The trigger event includes that, the UE 105 receives an instruction of the eNB 100; or the UE 105 obtains $|eRSRP_x - eRSRP_y| > T$ through measurement, where $eRSRP_x$ is eRSRP of a transport point with a port number x among the different transport points 101, 102, 103, and 104, $eRSRP_y$ is eRSRP of a transport point with a port number y among the different transport points 101, 102, 103, and 104, and T is a preset receiving power difference threshold or a threshold configured by the eNB for the UE. For example, when the UE 105 performs measurement to obtain that an eRSRP difference between the transport point 101 with the port number 0 and the transport point 102 with the port number 1 is greater than the preset threshold, the eRSRP is automatically reported to the eNB 100.

In Step 202, the UE 105 measures the eRSRP for the reference signals of the transport points 101, 102, 103, and 104.

In Step 203, the UE 105 reports the measured eRSRP of the transport points 101, 102, 103, and 104 to the eNB 100. Multiple kinds of specific report manners exist. For example, when reporting the eRSRP of the transport points 101, 102, 103, and 104 to the eNB 100, the UE 105 transmits the port numbers of the corresponding transport points; or the UE 105 reports the eRSRP of the different transport points 101, 102, 103, and 104 in an order predetermined by the eNB 100, for example, in an order of the ports allocated to the reference signals of the transport points 101, 102, 103, and 104. For details, reference may be made to FIG. 4 and relevant description. Moreover, when reporting, the UE 105 may select to transmit the measured eRSRP to the eNB 100, or transmit the measured eRSRP to the different transport points 101, 102, 103, and 104 and then the different transport points transmit the eRSRP to the eNB. In some embodiments, the UE 105 may only report the eRSRP of a part of the transport points according to an indication of the eNB 100, or the UE 105 only reports the eRSRP of the transport points that satisfy an event triggering condition.

In Step 204, the eNB 100 receives the eRSRP of the transport points 101, 102, 103, and 104 from the UE 105, to know channel information of path loss of the transport points 101, 102, 103, and 104, and based on the channel information, determine a corresponding optimization scheme for solving the problem of unbalanced power or perform other operations including resource allocation, power control, transport point selection, and the like.

Figure 4:
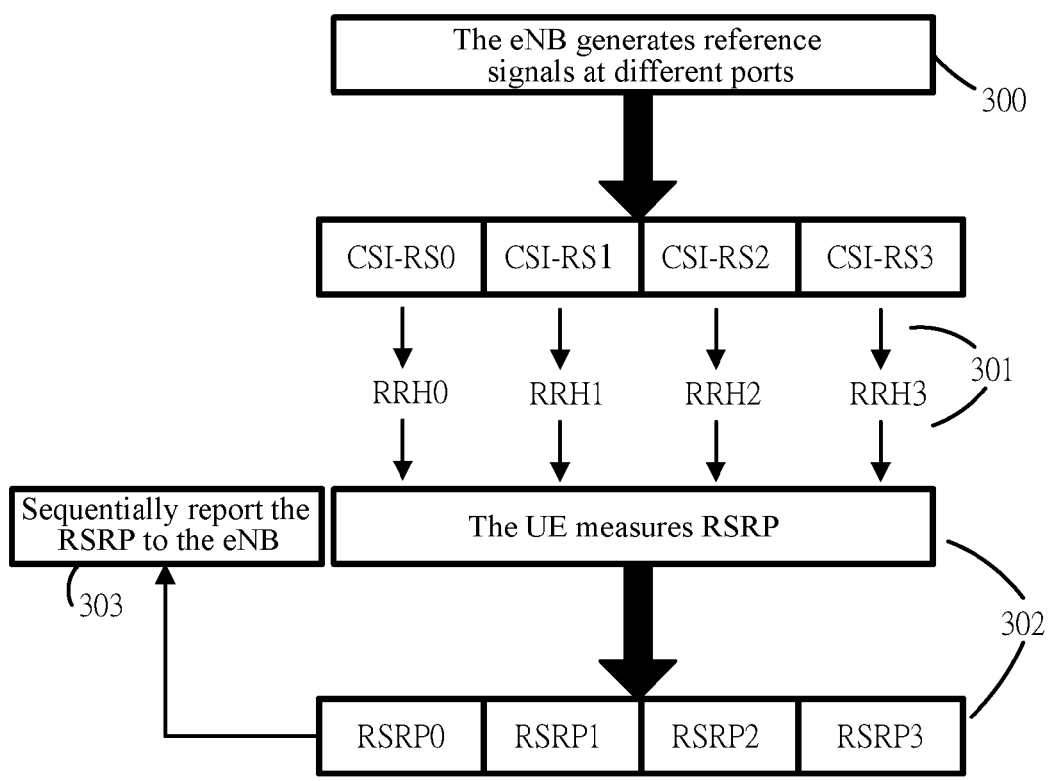
FIG. 4 is a schematic flow chart of a UE reporting eRSRP of transport points to an eNB in an order according to an embodiment of the present invention.

FIG. 4 shows another embodiment of the present invention. In this embodiment, an exemplary process for the UE 105 to report the RSRP of the transport points 101, 102, 103, and 104 to the eNB 100 in an order is further demonstrated.

In Step 300, the eNB 100 allocates different port numbers to different reference signals, to generate reference signals at different ports, for example, CSI-RS0, CSI-RS1, CSI-RS2, and CSI-RS3.

In Step 301, the reference signals with different reference signal ports CSI-RS0, CSI-RS1, CSI-RS2, and CSI-RS3 are transmitted to the corresponding transport points 101, 102, 103, and 104, that is, RRH0, RRH1, RRH2, and RRH3 respectively. The reference signals are further transmitted to the UE 105.

In Step 302, the UE 105 measures RSRP for the reference signals CSI-RS0, CSI-RS1, CSI-RS2, and CSI-RS3 of the transport points 101, 102, 103, and 104, to obtain corresponding RSRP0, RSRP1, RSRP2, and RSRP3.

In Step 303, RSRP0, RSRP1, RSRP2, and RSRP3 are sequentially reported to the eNB 100.

Figure 5:
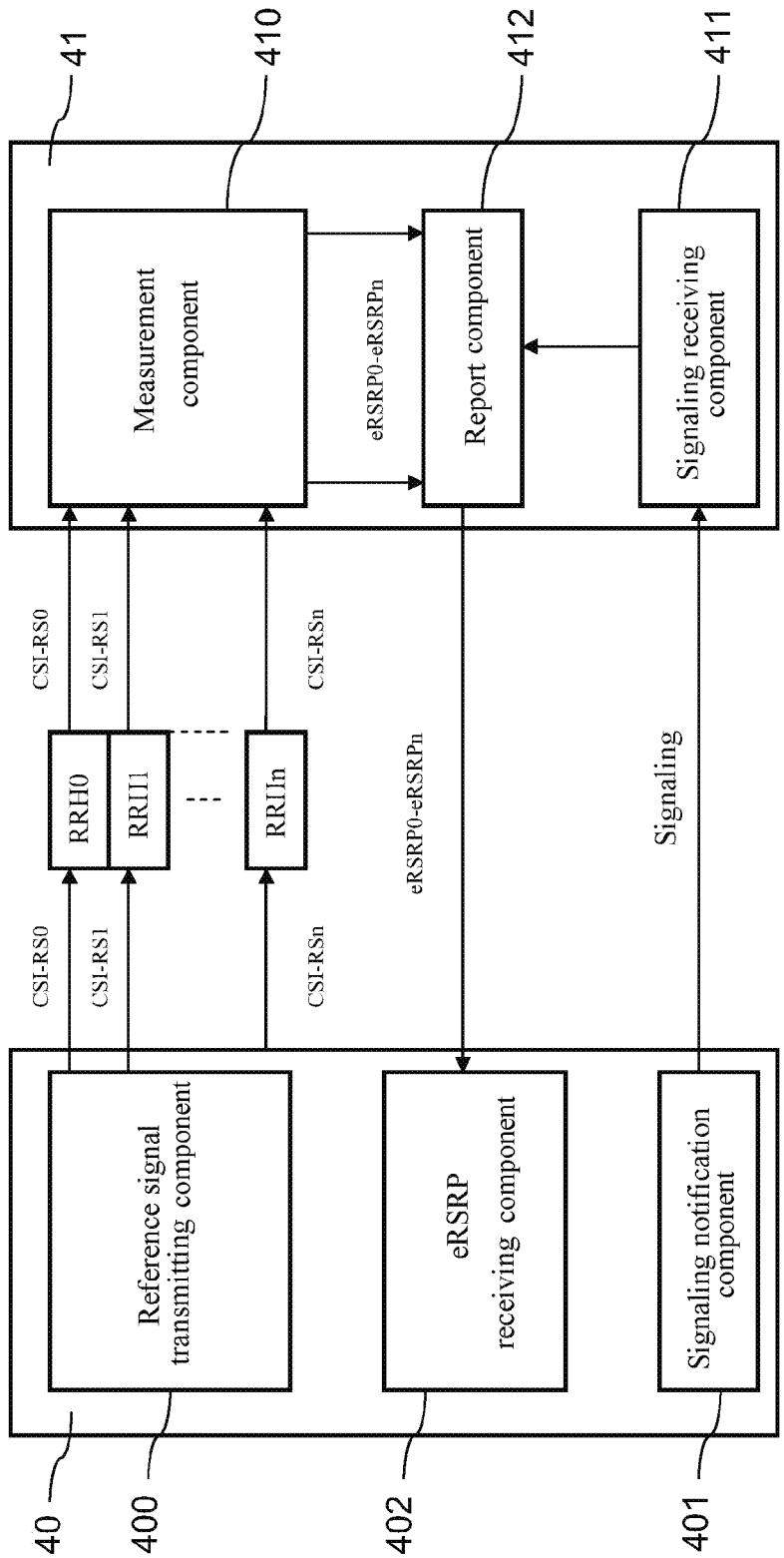
FIG. 5 is a structural block diagram of a DAS according to an embodiment of the present invention.

FIG. 5 is a structural block diagram of a DAS according to an embodiment of the present invention. In the DAS, an eNB 40 includes: a reference signal transmitting component 400, configured to transmit corresponding reference signals CSI-RS0 to CSI-RSn to different transport points RRH0 to RRHn; a signaling notification component 401, configured to notify, by means of signaling, a UE 41 of reporting the eRSRP of the different transport points RRH0 to RRHn periodically or in an event triggering manner; and an eRSRP receiving component 402, configured to receive eRSRP0 to eRSRPn of the different transport points RRH0 to RRHn, to determine a corresponding optimization scheme for solving a problem of unbalanced power at least. The problem of unbalanced power is solved by adjusting transmit power of the different transport points RRH0 to RRHn, a transport point selection operation, or a transport point grouping operation; and the adjustment includes increase, maintenance, or decrease. The corresponding UE 41 includes: a measurement component 410, configured to measure the eRSRP0 to eRSRPn of the different transport points RRH0 to RRHn; a signaling receiving component 411, configured to enable the UE 41 to report, according to received signaling sent by the eNB 40, the eRSRP0 to eRSRPn of the different transport points RRH0 to RRHn periodically or in an event triggering manner; and a report component 412, configured to report the measured eRSRP0 to eRSRPn of the different transport points RRH0 to RRHn to the eNB 40.

Through the antenna system and the method for reporting RSRP of the same provided by the present invention, an eNB obtains eRSRP of distributed transport points serving a UE, to know channel information of path loss of the transport points. Based on the information, the eNB may perform multiple kinds of corresponding operations, for example, solving the existing problem of unbalanced power, performing flexible transport point selection, implementing effective power control, or flexibly allocating resources, thereby greatly improving the system throughput.

The technical content and technical features of the present invention are disclosed above. However, persons skilled in the art can still make replacements and modifications without departing from the spirit of the present invention based on the teaching and disclosure of the present invention. Therefore, the protection scope of the present invention shall not be limited to the content disclosed in the embodiments, but shall include various replacements and modifications without departing from the spirit of the present invention and be covered by the claims of this patent.

We claim:

1. A base station, which is an evolved Node Base (eNB) located in a distributed antenna system (DAS), comprising:
   a reference signal transmitting component, configured to transmit different reference signals; and
   an enhanced Reference Signal Receiving Power (eRSRP) receiving component, configured to receive eRSRP of different transport points, reported sequentially in an order of ports allocated by the eNB to the reference signals of the different transport points, to determine a corresponding optimization scheme for solving a problem of unbalanced power at least.

2. The base station according to claim 1, wherein the eNB further comprises a signaling notification component, configured to notify, by means of signaling, a user equipment (UE) in the DAS of reporting the eRSRP of the different transport points periodically or in an event triggering manner.

3. The base station according to claim 2, wherein an event for triggering the event triggered report comprises:
   receiving, by the UE, an instruction of the eNB; or
   obtaining, through measurement by the UE, $|eRSRP_x - eRSRP_y| > T$, wherein $eRSRP_x$ is eRSRP of a transport point with a port number x among the different transport points, $eRSRP_y$ is eRSRP of a transport point with a port number y among the different transport points, and T is a preset receiving power difference threshold or a threshold configured by the eNB for the UE.

4. The base station according to claim 1, wherein the problem of unbalanced power is solved by adjusting transmit power of the different transport points, a transport point selection operation, or a transport point grouping operation; and the adjustment comprises increase, maintenance, or decrease.

5. The BS according to claim 1, wherein the eRSRP is RSRP or a value of path loss.

6. The BS according to claim 1, wherein the reference signal is a cell specific reference signal (CRS) or a channel state information-reference signal (CSI-RS).

7. A user equipment, comprising:
   a measurement component, configured to measure enhanced Reference Signal Receiving Power (eRSRP) of different transport points in a distributed system; and
   a report component, configured to report the measured eRSRP of the different transport points to an evolved Node Base (eNB) in the distributed system, the report component reports port numbers of the corresponding different transport points sequentially in an order of ports allocated by the eNB to the reference signals of the different transport points.

8. The user equipment according to claim 7, further comprising: a signaling receiving component, configured to receive a signaling sent by the eNB, whereby the report component reports the eRSRP of the different transport points periodically or in an event triggering manner in response to the received signaling.

9. The user equipment according to claim 8, wherein an event for triggering the event triggered report comprises:
  receiving, by the user equipment, an instruction of the eNB; or
  obtaining, through measurement by the user equipment $|eRSRP_x - eRSRP_y| > T$, wherein eRSRP is eRSRP of a transport point with a port number x among the different transport points, $eRSRP_y$ is eRSRP of a transport point with a port number y among the different transport points, and T is a preset receiving power difference threshold or a threshold configured by the eNB for the user equipment.

10. The user equipment according to claim 8, wherein the report component only reports the eRSRP of a part of the different transport points according to an indication of the eNB, or the user equipment only reports the eRSRP of the transport points that satisfy an event triggering condition.

11. The user equipment according to claim 7, wherein the eRSRP is RSRP or a value of path loss.

12. The user equipment according to claim 7, wherein the reference signal is a cell specific reference signal (CRS) or a channel state information-reference signal (CSI-RS).

13. The user equipment according to claim 7, wherein when reporting the measured eRSRP of the different transport points to the eNB, the user equipment transmits port numbers of the corresponding different transport points.

14. The user equipment according to claim 7, wherein the report component reports the eRSRP of the different transport points sequentially in an order of ports allocated by the eNB to the reference signals of the different transport points.

15. The user equipment according to claim 7, wherein after measuring the eRSRP of the different transport points, the report component transmits the measured eRSRP to the eNB, or the report component transmits the measured eRSRP to the different transport points and then the different transport points transmit the eRSRP to the eNB.

* * * * *